(12) United States Patent
Morrison et al.

(10) Patent No.: X6092
(45) Date of Patent: Aug. 25, 1830

(54) EXCAVATOR, FLOATING

(76) Inventors: William Morrison; George Tomb which ever case of it so breaking or running off, the loom will be stopped by the apparatus above specified.

In testimony that the above is a true specification of my said improvement as above described, I have hereunto set my hand and seal this sixth day of May in the year of our Lord One thousand eight hundred and thirty Witnesses
Geo Alden
James Richardson John Goulding ( Received and Recorded a new February 14. 1844. )

---

William Morrison & George Tomb.
Letters Patent August 25 1830.

The schedule referred to in these Letters Patent and making part of the same, containing a description in the words of the said Wm Morrison & George Tomb themselves, of their improvement in the Machine for clearing & deepening rivers, called the "Floating Excavator"

---

Be it known that we William Morrison and George Tomb, of Jersey Shore, Lycoming County, State of Pennsylvania, have made an improvement in the Machine for clearing & deepening rivers, called the "floating Excavator," & that the following is a description of the same— Construct a large boat sixty feet in length, to be varied according to the width of the rivers or channels [illegible]

magnitude of the work — The whole width to be 12 feet,
with arms projecting over at each side 4 feet, with
4 "Gunwales" of the full length of the ~~of the~~ length
of the boat to be placed 4 feet from each other & planked
on the bottom. The top of the boat & the arms also to be
covered with plank 2 inches thick, except a space
of four feet in the middle, which is left for a
moving carriage. On each end of this Boat are
placed 2 pieces of timber 24 feet in length, & con-
fined to the top of the Gunwales, to be 8 inches by
14 with a mortise thro each end at the outside of
the Boat, of sufficient size to admit a piece of tim-
ber 6 inches square, which passes thro that mor-
tise & an iron staple driven into the side of the
Boat, the end of the piece of timber to be sharpened,
& placed on the bottom of the river, said piece of tim-
ber has a mortise thro the upper end, of sufficient
size to receive a Lever 3 inches thick, & seven inches
in width, the end outside the Boat to be fastened to
a piece of iron placed perpendicularly, from the end
of the confined piece of timber, said piece of iron is
called a sword, 5 feet in length & may be varied as occasion
requires, & the end of the lever (which serves to raise the boat,
is fastened down by two perpendicular pieces of timber
of sufficient strength to hold the same, attached to the con-
fined pieces of timber in the centre of the boat —
There are to be 4 of the pieces of timber six inches square
made precisely alike, 4 levers, 4 iron swords, & 4 staples all
placed in simmilar positions, at the 4 corners of the
Boat, on the outside, each lever at the end fastened in
the same manner which by the force of the levers work. There is a smaller boat made with two gunwales & placed at a proper distance from the large one, such as circumstances require, as the channels to be cleared vary in width; said small boat to be of the same length of the large one & 8 feet wide, but not covered with plank on the top as the other, but having pieces of timber at each end confined in the same manner with like irons & timbers, to give effect to the operation of the levers as mentioned in the above description of the large boat, & also to cause it to remain stationary at the same time —

This small boat is to be attached to the large one by two pieces of timber 8 inches by 12, & to be sixty feet in length or it may vary according to the width of the channel or the bed of the river where the boat is used for improving the same —

In the vacancy 4 feet wide, mentioned in the large boat, is placed a carriage to move on rollers, supported by pieces of timber placed on the bottom of the boat, said carriage carrying a capstan, & to be 20 feet in length & 4 feet wide, with 4 rollers on the bottom of the side pieces that support the capstan, & 2 rollers on the side pieces above mentioned next to the small boat. The capstan is 30 inches high & thro it passes a perpendicular shaft 12 inches in diameter, & 5 feet in length or height with a sweep attached to the top 9 feet in length. Under the top of the capstan around the perpendicular shaft is a barrel 28 inches in diameter, & may be varied in size as occasion requires; said barrel is to move round said shaft and is attached & when at work fastened to the shaft by an iron key to facilitate its revolutions around the shaft —
To the barrel is attached a chain or large rope passing over a roller erected in front of the perpendicular shaft; which rope or chain is attached to a harrow, first (if the gravel requires loosening) & then the harrow is laid aside, & the rope or chain is fastened to a scraper for the purpose of removing the gravel, dirt, or loose rock in the river. The scraper is of the form as represented in the drawing & model deposited in the Patent Office.

The Harrow, the wood part of which is 3 feet in length & is of a triangular form, the timbers 6 inches thick & 15 inches wide at the centre, with 2 iron teeth placed 2 feet from the forward end; the teeth are 30 inches long & 2 inches & a half by one inch & a half in size — A piece of timber is mortised into the forward end 6 feet long with another piece passing thro the top end as a handle — There are also 2 handles placed upon the back part, which are more perfectly represented in the model & drawing. On the end of the arms next the small boat, is placed a piece of timber to support a small moving carriage & rollers to move simultaneously with the carriage, to which the capstan is attached as above described —

The principle on which the machine operates is this; the power exercised by the levers, confines the boats in a stationary position in the current of the river while at work, the water floating under the boat — A horse is attached to the end of the sweep, & walks around on the top of the boat,
[illegible]

regulate the scraper or harrow, & the power of the horse thus brought to bear will draw the scraper thro, the gravel or loose rock, & will move from one to two tons in proportion to the quantity that the scraper will contain. When the scraper is filled & drawn to the place where the gravel is to be depos-ited & the scraper emptied, the key is taken out of the barrel, & being loose, enables the man who walk on slip logs, placed from one boat to the other, to draw the scraper or harrow, & place it in a proper position to be again filled; the horse standing during this time – then the barrel is again keyed up & the horse moves as before – & In this manner 5 men & a horse with a boat of the above dimensions will excavate from 60 to 70 cubic yards of gravel per day, & can be used in water from one to 6 feet in depth – Said Boat is stationed in the river in the direction of the current of the Stream.

For a more particular description of our invention reference must be made to the model & drawing of the same deposited in the Patent Office.

In testimony whereof we have hereunto signed our names before two witnesses & made oath to the same at the City of Washington on this 21st day of August 1830 –

Witnesses
William P. Elliot
Charles M. Keller

Wm Morrison
George Tomb,

Received & Recorded anew June 17. 1844